United States Patent [19]
Garbo

[11] Patent Number: 5,279,072
[45] Date of Patent: Jan. 18, 1994

[54] HOLDER FOR A FLORAL ARRANGEMENT

[76] Inventor: Robert J. Garbo, 55 Chatterton Woods, Hamden, Conn. 06518

[21] Appl. No.: 813,255

[22] Filed: Dec. 24, 1991

[51] Int. Cl.$^5$ .............................................. A01G 5/00
[52] U.S. Cl. ...................................... 47/41.14; 47/39
[58] Field of Search ....................... 47/41.14, 47, 39; 248/156, 146

[56] References Cited

U.S. PATENT DOCUMENTS

| | | | |
|---|---|---|---|
| 1,763,130 | 6/1930 | Cartwright | 47/41.4 |
| 1,831,308 | 11/1931 | Kuck | 47/41.4 |
| 3,511,501 | 5/1970 | Sandberg | 47/41.1 |

FOREIGN PATENT DOCUMENTS

| | | | |
|---|---|---|---|
| 552794 | of 1932 | Fed. Rep. of Germany | 47/41.10 |
| 8062 | of 1895 | United Kingdom | 47/41.11 |

Primary Examiner—Ramon S. Britts
Assistant Examiner—Joanne C. Downs
Attorney, Agent, or Firm—Thomas R. Morrison

[57] ABSTRACT

A container for a cemetery floral arrangement consists of a disposable paper cup adapted to hold the arrangement and a reusable plastic holder for supporting and retaining the cup in a desired position on the ground. The holder comprises a cup portion adapted to retainingly receive the paper cup and a projecting, tapered, cruciform spike, on the bottom of the cup portion, for fixing the holder in the ground.

7 Claims, 1 Drawing Sheet

U.S. Patent  Jan. 18, 1994  5,279,072
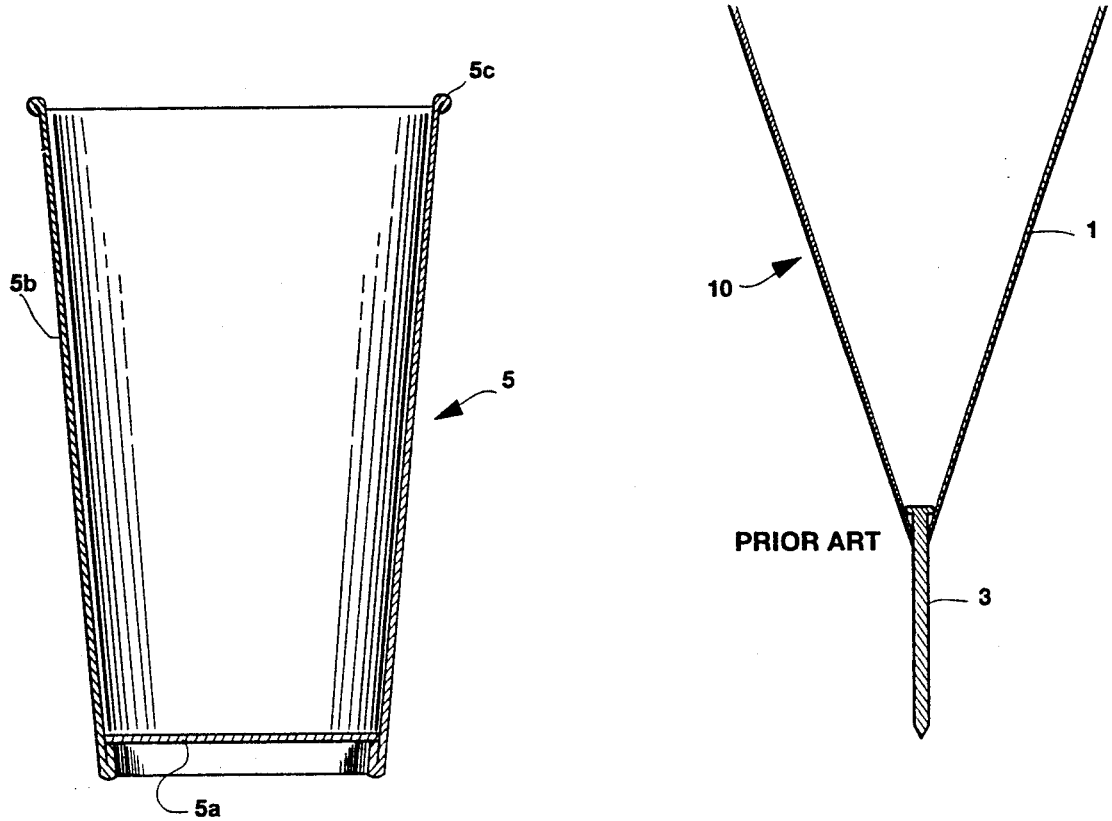
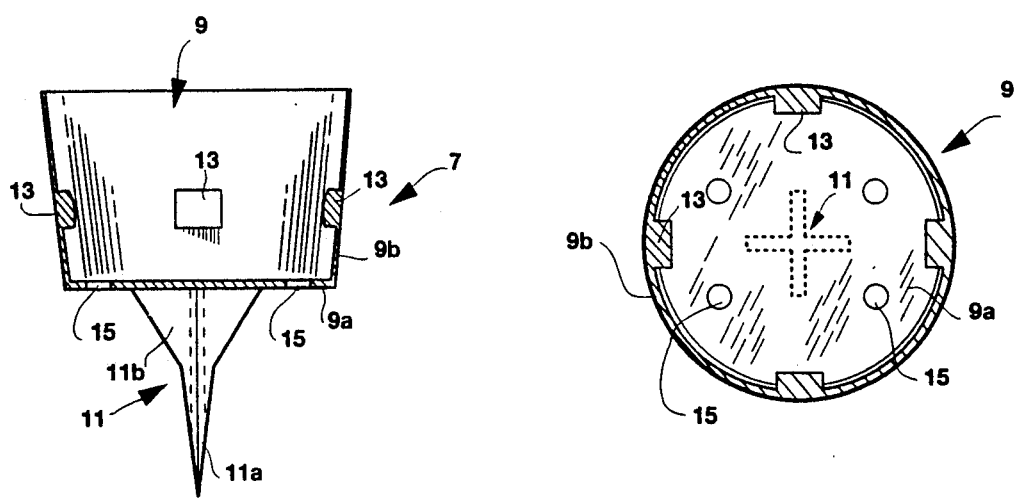
FIG. 2  FIG. 1
FIG. 3  FIG. 4

HOLDER FOR A FLORAL ARRANGEMENT

BACKGROUND OF THE INVENTION

The present invention pertains to a container for a floral arrangement and, more particularly, to a container for supporting and retaining a floral arrangement in a desired position on the ground, especially in a cemetery or the like.

It is a common practice, in many cultures, to show respect for the deceased by placing floral arrangements in the ground comprising or adjacent the gravesite. Often, these floral arrangements are placed in containers comprising a sheet metal cone formed around a projecting metal spike or nail. The spike is forced into the ground to retain the container in a desired location. Such containers suffer, however, in that they are comparatively costly, awkward to transport, and somewhat lacking in ability to retain a desired position.

OBJECTS AND SUMMARY OF THE INVENTION

Accordingly, it is an object of the invention to provide a container for a floral arrangement, and in particular a cemetery floral arrangement, which will reliably retain a desired position and orientation in the ground.

It is a further object of the invention to provide a container of the aforesaid type which is inexpensive and convenient to transport.

Briefly stated, there is provided a container for a floral arrangement comprising a cup member adapted to accept the floral arrangement and a holder member adapted to support and retain the cup member in a desired position on the ground. The holder member comprises a cup portion adapted to retainingly receive the cup member and a projecting, tapered, cruciform spike, on the bottom of the cup portion, for fixing the holder member in the ground.

In accord with a feature of the invention, the cup member may advantageously comprise a disposable paper cup of a type and size now commercially available.

The above and other objects, features and advantages of the present invention will become apparent from the following description read in conjunction with the accompanying drawings.

BRIEF DESCRIPTION OF THE DRAWINGS

FIG. 1 is a cross-sectional view of a common prior art floral container;

FIG. 2 is a cross-sectional view of a floral container cup member in accord with the present invention;

FIG. 3 is a cross-sectional view of a floral container holder member in accord with the present invention; and FIG. 4 is a top plan view of the holder member of FIG. 3.

DETAILED DESCRIPTION OF THE PREFERRED EMBODIMENT

Referring now to FIG. 1, there is shown, generally at 10, a common prior art floral container comprising an imperforate, flower-holding sheet metal cone 1 formed about a projecting common metal nail 3. To increase the rigidity of cone 1, and also to reduce the exposure of its sharp edge, the cone terminus 1a is turned radially inwardly.

In use, container 10 is retained upright in a desired position by nail 3, which is forced into the ground. However, due to the comparatively small, circular cross-section of nail 3, it has relatively little ground-gripping ability and, hence, offers little resistance to unwanted displacement of container 10, either removal from the ground or tilting from an upright orientation. Further, due to the presence of nail 3, containers of this type can not be nested for shipment or storage.

The floral container of the present invention comprises a cup member 5 adapted to accept a floral arrangement and a holder member 7 adapted to support and retain cup member 5 in a desired position on the ground.

As illustrated in FIG. 2, cup member 5 includes a substantially planar cup base 5a and a frusto-conical cup wall 5b. An outwardly curled lip 5c is formed in the distal edge of cup wall 5b. It is to be noted that cup member 5 is imperforate and is formed of a water-proof or water-resistant material. Advantageously, cup member 5 comprises a disposable paper or cardboard cup of a type which is commercially available. In this event, the paper or cardboard material is impregnated or coated, at least on inner surface of the cup, with a waterproofing material, in the manner commonly employed in the manufacture of disposable drinking cups and the like.

As best seen in FIG. 3, holder member 7 includes a cup-engaging portion 9 adapted to receive cup member 5, and a retainer portion 11 for fixing holder member 7 in place on the ground. Cup-engaging portion 9 includes a substantially planar, circular support base 9a and an integrally formed, upstanding frusto-conical support wall 9b. It is to be noted that cup-engaging portion 9 of holder member 7 is substantially congruent with the corresponding portion of cup member 5, i.e. cup member 5 will nest within cup-engaging portion 9. A plurality (4 are shown) of curved ratchet tabs 13 are formed on the inner surface of support wall 9b, at regularly spaced intervals. Ratchet tabs 13 are adapted to engage cup wall 5b when cup member 5 is inserted into cup-engaging portion 9, thereby securing cup member 5 to holder member 9, even if cup member 5 is slightly deformed or undersized. A plurality (4 are shown) of weep holes 15 are formed in support base 9a to prevent the collection of water within cup-engaging portion 9 and consequent "wicking" of a paper or cardboard cup member secured therein.

Retainer portion 11 comprises a projecting, tapered, cruciform spike of 4 identical wings, integrally formed on support base 9a, on the side thereof opposite support wall 9b. The spike comprises a comparatively narrower, sharp-pointed distal segment 11a, adapted to facilitate insertion of the spike into the ground, and a comparatively broader connecting segment 11b for maximum ground contact.

Advantageously, holder member 7 is formed of a plastic material, preferably ABS plastic, by injection molding.

Having described the preferred embodiment of the invention with reference to the accompanying drawings, it is to be understood that the invention is not limited to this precise embodiment, and that various changes and modifications may be effected therein by one skilled in the art without departing from the scope or spirit of the invention as defined in the appended claims.

What is claimed is:

1. A container for a floral arrangement consisting of:
   a cup member adapted to accept the floral arrangement, said cup member including a substantially planar cup base and a frusto-conical cup wall extending therefrom; and
   a holder member adapted to support and retain said cup member upright, in a desired position on the ground, said holder member including a cup-engaging portion adapted to receive said cup member and a retainer portion for fixing said holder member in place on the ground;
   said cup-engaging portion including a substantially planar, circular support base and an integrally formed, upstanding, frusto-conical support wall, said cup engaging portion being substantially congruent with said cup base and a portion of said cup wall adjacent thereto; and
   said retainer portion comprising a projecting, tapered cruciform spike member fixed to the center of said support base on a side thereof opposite said support wall.

2. The container of claim 1, wherein said spike member is integrally formed on said support base.

3. The container of claim 1, wherein said spike member comprises a comparatively narrower, sharp-pointed distal segment and a comparatively broader connecting segment joining said distal segment to said support base.

4. The container of claim 1, further comprising a plurality of projecting tabs disposed on the inner surface of said support wall.

5. The container of claim 1, further comprising means defining a plurality of holes in said support base.

6. The container of claim 1, wherein said cup member is a paper or cardboard cup.

7. The container of claim 2, wherein said holder member is formed of plastic.

* * * * *